US012588006B2

(12) United States Patent
Venugopal et al.

(10) Patent No.: US 12,588,006 B2
(45) Date of Patent: Mar. 24, 2026

(54) TECHNIQUES FOR SIGNALING A PANEL SWITCHING CAPABILITY OF A USER EQUIPMENT

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 17/574,420

(22) Filed: Jan. 12, 2022

(65) Prior Publication Data

US 2022/0225305 A1      Jul. 14, 2022

Related U.S. Application Data

(60) Provisional application No. 63/136,863, filed on Jan. 13, 2021.

(51) Int. Cl.
| | |
|---|---|
| *H04W 72/04* | (2023.01) |
| *H04B 7/06* | (2006.01) |
| *H04W 8/24* | (2009.01) |
| *H04W 72/044* | (2023.01) |

(52) U.S. Cl.
CPC ........ *H04W 72/044* (2013.01); *H04B 7/0691* (2013.01); *H04W 8/24* (2013.01)

(58) Field of Classification Search
None
See application file for complete search history.

(56) References Cited

U.S. PATENT DOCUMENTS

| | | | | |
|---|---|---|---|---|
| 11,463,953 B2 * | 10/2022 | Guan | ..................... | H04W 52/16 |
| 11,888,565 B2 * | 1/2024 | Zhang | ................... | H04B 7/0874 |
| 2021/0153215 A1 | 5/2021 | Guan et al. | | |
| 2021/0168714 A1 | 6/2021 | Guan et al. | | |
| 2022/0095358 A1 * | 3/2022 | Xu | ......................... | H04J 3/1682 |

FOREIGN PATENT DOCUMENTS

| | | |
|---|---|---|
| WO | WO-2021035389 A1 | 3/2021 |
| WO | WO-2021159963 A1 | 8/2021 |
| WO | WO-2021163937 A1 | 8/2021 |

* cited by examiner

*Primary Examiner* — Willie J Daniel, Jr.
(74) *Attorney, Agent, or Firm* — Holland & Hart LLP

(57) ABSTRACT

Methods, systems, and devices for wireless communications are described. In some systems, a user equipment (UE) may identify that the UE is capable of performing up to a maximum quantity of antenna panel switches within a slot. For example, the UE may be capable of switching from operating one or more first antenna panels to operating one or more second antenna panels up to a maximum quantity of times within a slot. In some aspects, the UE may transmit an indication of the UE capability to a base station. The base station, based on receiving the indication of the UE capability, may transmit activation signaling indicating one or more antenna panel switches at the UE within a slot that is less than or equal to the maximum quantity of antenna panel switches per slot indicated by the UE capability.

28 Claims, 15 Drawing Sheets

115-b 105-b

305 — Identify maximum quantity of antenna panel switches that the UE performs per slot UE Capability

310

Activation Signaling

315

320

Communicate while satisfying the maximum quantity of antenna panel switches per slot

300

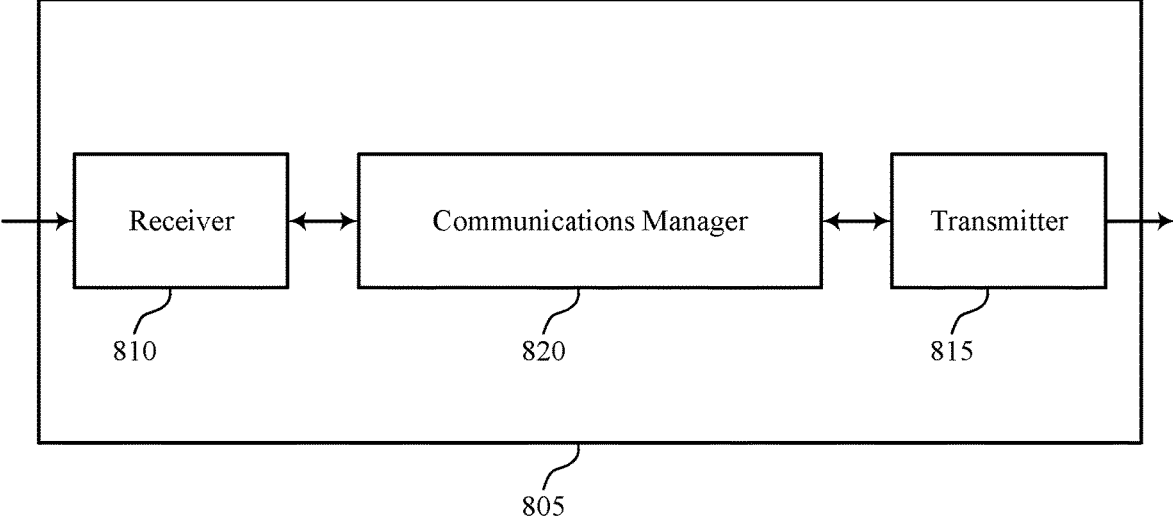
810
820
815
805
800
FIG. 8

Identify, as a UE capability, a maximum quantity of antenna panel switches that the UE performs per slot

1205

Transmit, to a base station, an indication of the UE capability

1210

Communicate with the base station via one or more antenna panels of the UE while satisfying the maximum quantity of antenna panel switches per slot indicated by the UE capability

1215

1200

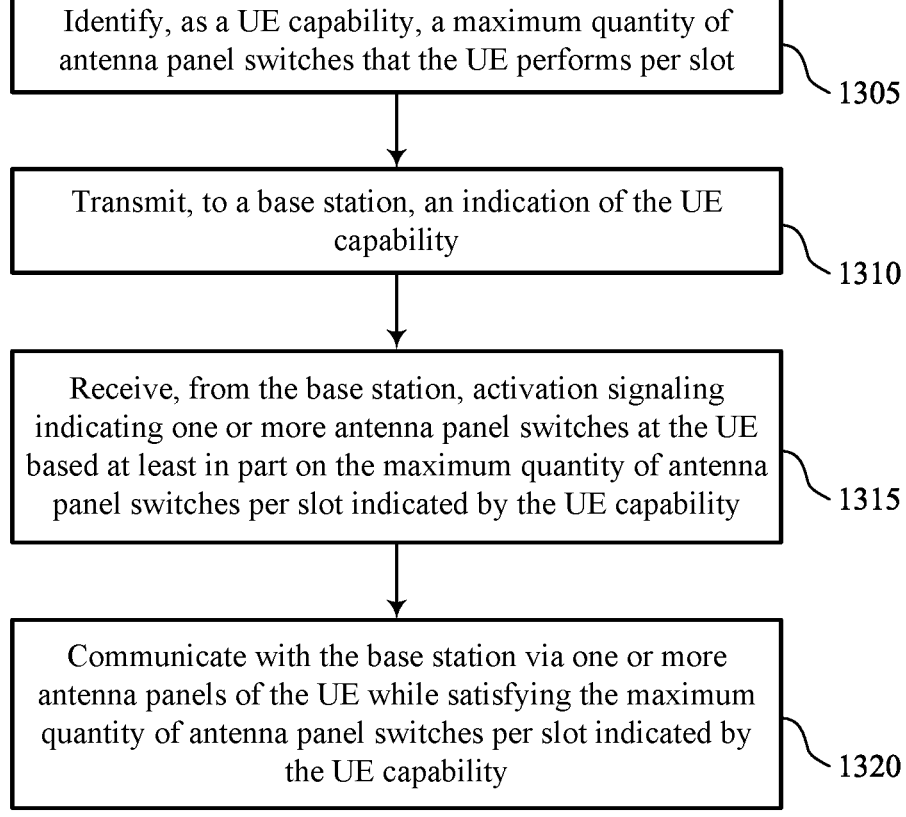

Identify, as a UE capability, a maximum quantity of antenna panel switches that the UE performs per slot
1305

Transmit, to a base station, an indication of the UE capability
1310

Receive, from the base station, activation signaling indicating one or more antenna panel switches at the UE based at least in part on the maximum quantity of antenna panel switches per slot indicated by the UE capability
1315

Communicate with the base station via one or more antenna panels of the UE while satisfying the maximum quantity of antenna panel switches per slot indicated by the UE capability
1320

Receive, from a UE, an indication of a UE capability associated with a maximum quantity of antenna panel switches that the UE performs per slot

1405

Communicate with the UE via one or more antenna panels of the UE while satisfying the maximum quantity of antenna panel switches per slot indicated by the UE capability

1410

1400

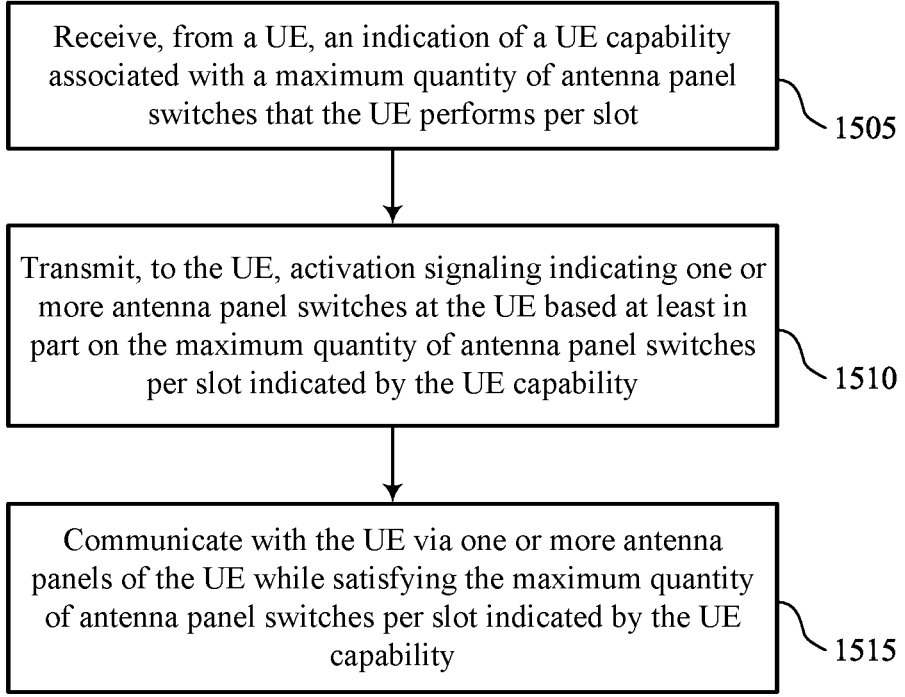

Receive, from a UE, an indication of a UE capability associated with a maximum quantity of antenna panel switches that the UE performs per slot 〜1505

Transmit, to the UE, activation signaling indicating one or more antenna panel switches at the UE based at least in part on the maximum quantity of antenna panel switches per slot indicated by the UE capability 〜1510

Communicate with the UE via one or more antenna panels of the UE while satisfying the maximum quantity of antenna panel switches per slot indicated by the UE capability 〜1515

TECHNIQUES FOR SIGNALING A PANEL SWITCHING CAPABILITY OF A USER EQUIPMENT

CROSS REFERENCE

The present Application for Patent claims the benefit of U.S. Provisional Patent Application No. 63/136,863 by VENUGOPAL et al., entitled "TECHNIQUES FOR SIGNALING A PANEL SWITCHING CAPABILITY OF A USER EQUIPMENT," filed Jan. 13, 2021, assigned to the assignee hereof, and expressly incorporated by reference herein.

FIELD OF TECHNOLOGY

The following relates to wireless communications, including techniques for signaling a panel switching capability of a user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for signaling a panel switching capability of a user equipment (UE). Generally, the described techniques support a signaling exchange between the UE and a base station that provides the base station with information relating to a quantity of antenna panel switches the UE is capable of performing within a time period, such as within a slot. In some aspects, the quantity of antenna panel switches that the UE is capable of performing within the time period may be based on a capability of the UE, and the UE may transmit an indication of the capability to the base station according to various signaling. For example, the UE may transmit the indication of the capability to the base station via radio resource control (RRC) signaling, a medium access control (MAC) control element (MAC-CE), or uplink control information (UCI).

In some aspects, the indication of the capability of the UE may define the quantity of antenna panel switches that the UE is capable of performing within the time period specific to one or more frequency ranges or specific to one or more antenna panels of the UE. For example, the capability may define the quantity of antenna panel switches that the UE is capable of performing within the time period for a radio frequency band, a set of radio frequency bands, or a component carrier. Additionally or alternatively, the capability may indicate a set of antenna panels for which the quantity of antenna panel switches that the UE is capable of performing within the time period applies. In other words, the quantity of antenna panel switches that the UE is capable of performing within the time period may be specific for a frequency range or a set of antenna panels indicated by the capability, or both.

BRIEF DESCRIPTION OF THE DRAWINGS

FIGS. 8 and 9 show block diagrams of devices that support techniques for signaling a panel switching capability of a UE in accordance with aspects of the present disclosure.

FIGS. 12 through 15 show flowcharts illustrating methods that support techniques for signaling a panel switching capability of a UE in accordance with aspects of the present disclosure.

DETAILED DESCRIPTION

Figure 1:
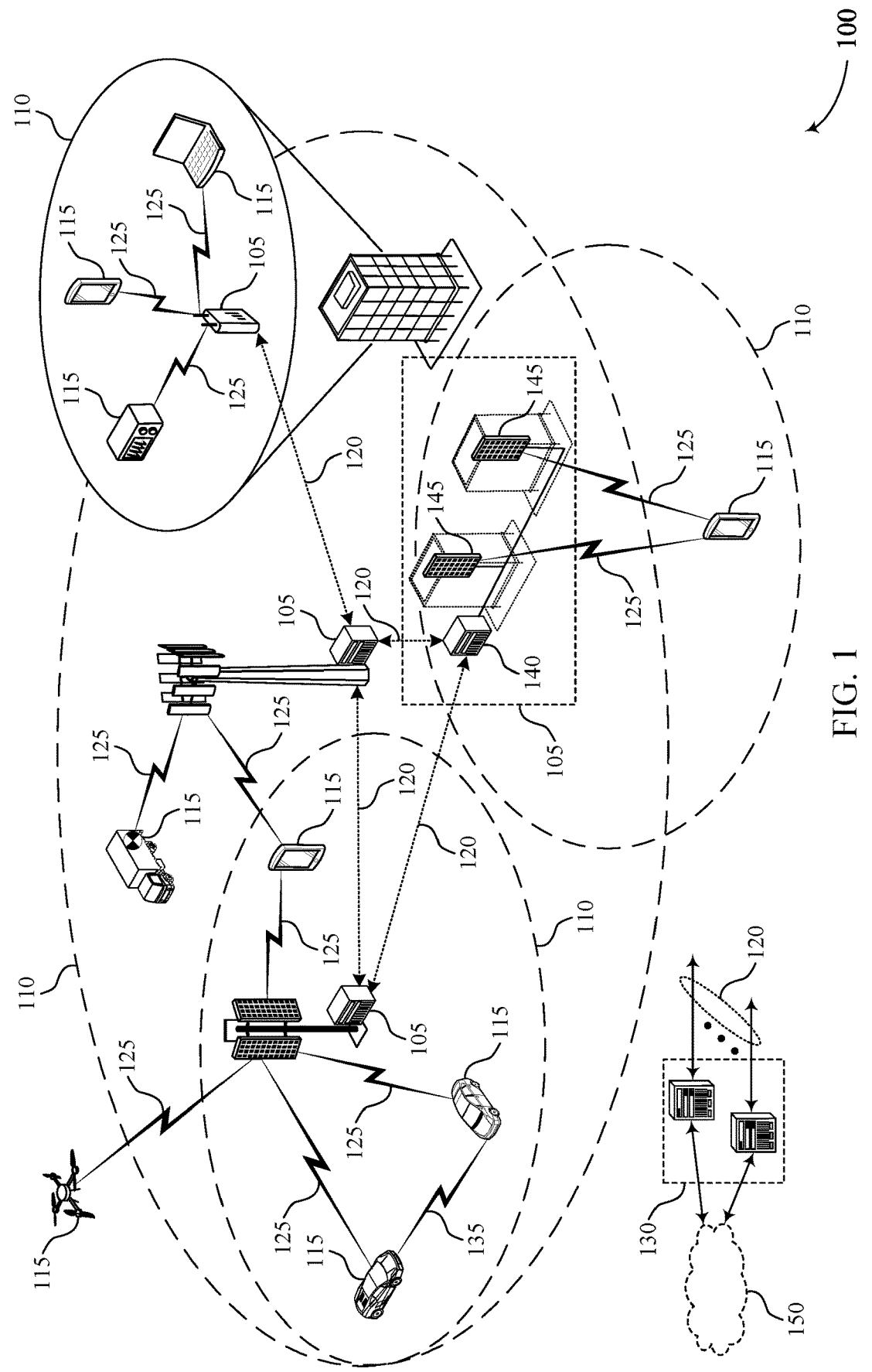
FIGS. 1 and 2 illustrate examples of wireless communications systems that support techniques for signaling a panel switching capability of a user equipment (UE) in accordance with aspects of the present disclosure.

In some wireless communications systems, a user equipment (UE) and a base station may communicate over a communication link. The communication link may include an uplink for communication from the UE to the base station and a downlink for communication from the base station to the UE. In some aspects, the UE may transmit or receive signaling to or from the base station via one or more antenna panels of the UE. For example, for a scheduled transmission, the UE may select one or more antenna panels of the UE to use for transmitting or receiving the scheduled transmission. In some cases, the UE may use different antenna panels for some scheduled transmissions such that, between such scheduled transmissions, the UE may switch between using a first one or more antenna panels to using a second one or more antenna panels.

In some examples, the UE may be associated with a capability that limits a quantity of antenna panel switches (a quantity of instances that the UE may switch from operating a first antenna panel to operating a second antenna panel) that the UE may perform within a time period. The base station, however, may be unaware of such a capability that limits the quantity of antenna panel switches that the UE may perform, which may result in a scheduling of a greater quantity of antenna panel switches than the UE is capable of performing. As such, the UE may be unable to or otherwise refrain from performing one or more scheduled antenna panel switches, which may result in sub-optimal uplink interference management or a lower likelihood for success-ful communication between the UE and the base station (e.g., especially in examples in which the UE communicates with the base station in a multi-transmission and reception point (TRP) deployment).

In some implementations of the present disclosure, the UE and the base station may support capability signaling that defines a maximum quantity of antenna panel switches that the UE is capable of performing within the time period. For example, the UE may identify or otherwise determine the maximum quantity of antenna panel switches that the UE is capable of performing within the time period and may transmit capability signaling to the base station that defines the quantity. As such, the base station may identify the antenna panel switching capability of the UE and may schedule transmissions or antenna panels switches at the UE in accordance with the capability. In some examples, for instance, the base station may transmit activation signaling indicating one or more antenna panel switches at the UE in accordance with (e.g., such that the one or more antenna panel switches are less than or equal to) the maximum quantity of antenna panel switches defined by the capability signaling. In some aspects, the capability signaling may define the maximum quantity of antenna panel switches that the UE is capable of performing per slot and, in such aspects, the UE may perform a quantity of antenna panels switches that is equal to or less than the maximum quantity defined by the capability signaling in each slot.

Particular aspects of the subject matter described in this disclosure can be implemented to realize one or more of the following potential advantages. For example, the described techniques may be implemented to provide a mutual under-standing between the UE and the base station of the maxi-mum quantity of antenna panel switches that the UE may perform within the time period, which may enable the base station to avoid scheduling transmissions or antenna panel switches that would exceed the maximum quantity defined by the UE capability. As such, the UE may achieve enhanced uplink interference management as the UE will have a greater likelihood for actually performing antenna panel switches intended for uplink interference management. Fur-ther, based on the base station scheduling transmissions or antenna panel switches in accordance with the capability of the UE, the UE and the base station may experience a greater likelihood for successful communication between the UE and the base station (as the likelihood that the UE exceeds the maximum quantity decreases and, in turn, the likelihood that the UE is able to perform a scheduled antenna panel switch increases). As such, the UE and the base station may experience higher data rates, increased throughput and capacity, and greater spectral efficiency, among other ben-efits. Additionally, based on the base station scheduling transmissions or antenna panel switches in accordance with the capability of the UE, the UE may achieve greater power savings and have a greater likelihood for satisfying an exposure constraint of the UE.

Aspects of the disclosure are initially described in the context of wireless communications systems. Additionally, aspects of the disclosure are illustrated by and described with reference to a process flow. Aspects of the disclosure are further illustrated by and described with reference to apparatus diagrams, system diagrams, and flowcharts that relate to techniques for signaling a panel switching capabil-ity of a UE.

FIG. 1 illustrates an example of a wireless communica-tions system 100 that supports techniques for signaling a panel switching capability of a UE in accordance with aspects of the present disclosure. The wireless communica-tions system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communica-tions system 100 may support enhanced broadband commu-nications, ultra-reliable (e.g., mission critical) communica-tions, low latency communications, communications with low-cost and low-complexity devices, or any combination thereof.

The base stations 105 may be dispersed throughout a geographic area to form the wireless communications sys-tem 100 and may be devices in different forms or having different capabilities. The base stations 105 and the UEs 115 may wirelessly communicate via one or more communica-tion links 125. Each base station 105 may provide a geo-graphic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, inte-grated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may commu-nicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier (ID) for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support capability signaling between a UE 115 and a base station 105. For example, the UE 115 may transmit the capability signaling to the base station 105 to inform the base station 105 of one or more capabilities of the UE 115. In some aspects, the capability signaling may include an indication of one or more limits of the UE 115, such as an upper limit (e.g., a maximum) or a lower limit (e.g., a minimum) for one or more communication parameters or configurations. In some examples, for instance, the UE 115 may identify an upper limit or maximum quantity of antenna panel switches that the UE 115 is capable of performing within a time period, such as within a slot.

In some implementations of the present disclosure, the UE 115 may transmit, to the base station 105, an indication of the upper limit or maximum quantity of antenna panel switches that the UE 115 is capable of performing per slot. Accordingly, the base station 105 may receive the indication, identify the capability of the UE 115, and configure or otherwise communicate with the UE 115 in accordance with (i.e., while satisfying) the capability of the UE 115.

Figure 2:
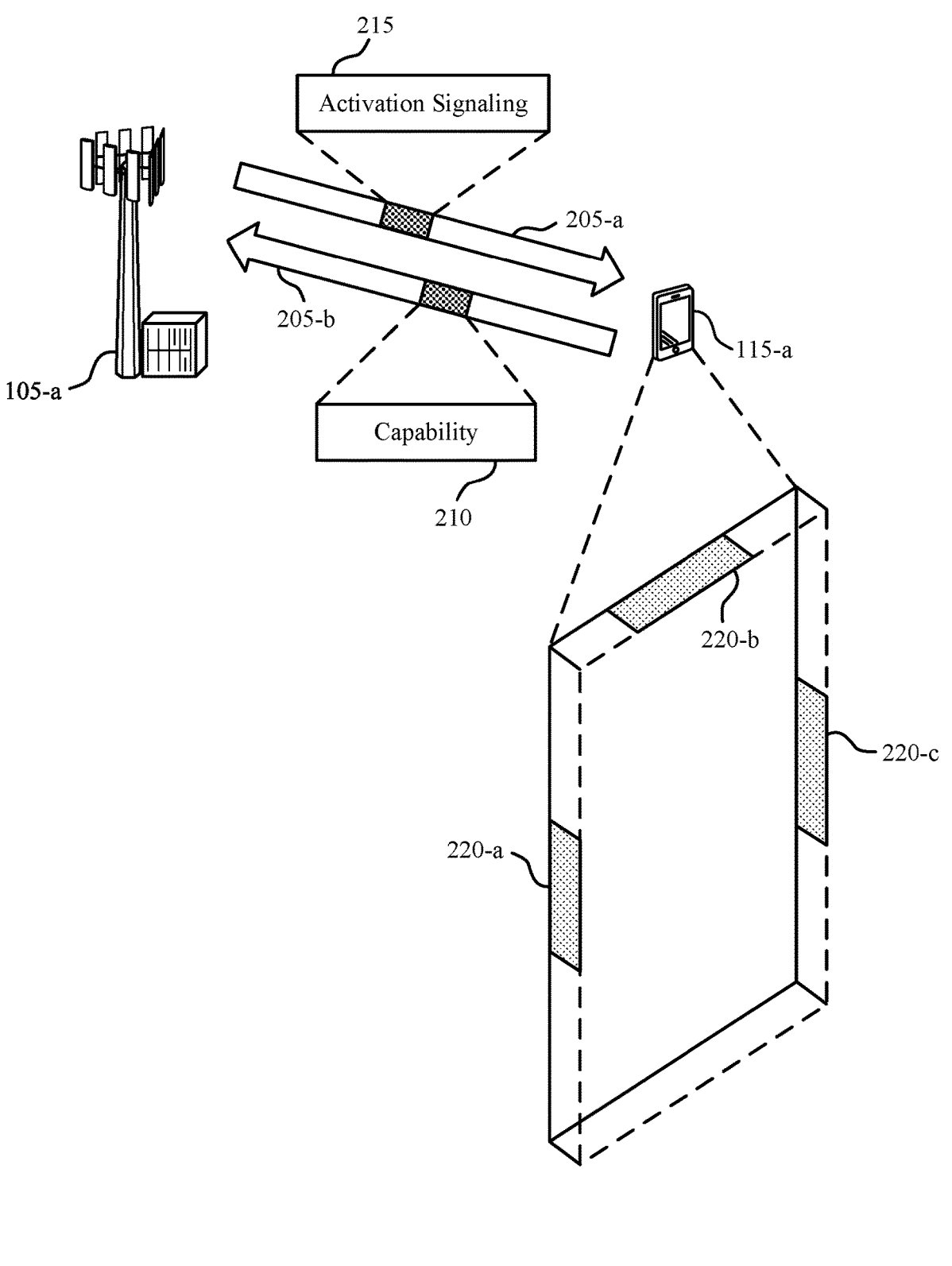

FIG. 2 illustrates an example of a wireless communications system 200 that supports techniques for signaling a panel switching capability of a UE in accordance with aspects of the present disclosure. The wireless communications system 200 may implement or be implemented to realize aspects of the wireless communications system 100. For example, the wireless communications system 200 may include a UE 115-*a* and a base station 105-*a*, which may be examples of corresponding devices described herein, including with reference to FIG. 1. In some examples, the UE 115-*a* may transmit a capability 210 to the base station 105-*a* indicating an upper limit or maximum quantity of antenna panel switches that the UE 115-*a* is capable of performing per time period, such as per slot.

For example, the UE 115-*a* may be configured with a number of antenna panels 220 and may operate one or more of the number of antenna panels 220 to communicate with the base station 105-*a*. As such, the UE 115-*a* may be equivalently referred to as a multi-panel UE (or an MP-UE). As shown in FIG. 2, the UE 115-*a* may be configured with three antenna panels 220 including an antenna panel 220-*a*, an antenna panel 220-*b*, and an antenna panel 220-*c*. However, although shown in FIG. 2 as being configured with three antenna panels 220 at various locations, the UE 115-*a* may be configured with any number of antenna panels 220 at any location or orientation on the UE 115-*a* without exceeding the scope of the present disclosure.

The UE 115-*a* may communicate with the base station 105-*a* via a communication link 205, including a downlink communication link 205-*a* over which the base station 105-*a* may transmit to the UE 115-*a* and an uplink communication link 205-*b* over which the UE 115-*a* may transmit to the base station 105-*a*. The UE 115-*a* may transmit signaling to or receive signaling from the base station 105-*a* via one or more antenna panels 220. In some aspects, the UE 115-*a* may select which antenna panels 220 to operate to transmit or receive to or from the base station 105-*a* based on one or more conditions or constraints at the UE 115-*a*.

For example, the UE 115-*a* may select to operate one or more of the antenna panels 220 based on a maximum permissible exposure (MPE) constraint at the UE 115-*a* or based on a power saving mode being activated at the UE 115-*a*. Additionally or alternatively, the UE 115-*a* may select to operate one or more antenna panels 220 based on an uplink interference management procedure at the UE 115-*a* (e.g., to avoid generating interference at different device or at a different antenna panel 220 of the UE 115-*a*) or based on a panel configuration. For example, the UE 115-*a* may support multiple different configurations across antenna panels 220 and the UE 115-*a* may operate various antenna panels 220 based on which of the different configurations the UE 115-*a* is employing. Additionally or alternatively, the UE 115-*a* may operate one or more antenna panels 220 based on a deployment or communication scenario of the UE 115-*a*. For example, if the UE 115-*a* operates in a multi-TRP (which may be equivalently referred to as mTRP) deployment, the UE 115-*a* may operate one or more antenna panels 220 based on a number of TRPs with which the UE 115-*a* communicates.

In some cases, such panel selection at the UE 115-*a* may be led or otherwise initiated by the UE 115-*a* such that the UE 115-*a* may select or activate one or more antenna panels 220 without signaling or assistance from the base station 105-*a*. In such cases, the UE 115-*a* may select the one or more antenna panels 220 for an uplink transmission from the UE 115-*a* to the base station 105-*a* via the uplink communication link 205-*b*. Accordingly, in some aspects, the antenna panel selection may be referred to as uplink panel selection (or fast uplink panel selection). As such, the selected antenna panels 220 may be referred to as uplink transmission panels (because the selected antenna panels 220 are used for an uplink transmission from the UE 115-*a* to the base station 105-*a*) and, in some cases, the uplink transmission panels may be a same set as or a subset of a set of downlink reception panels, which may include antenna panels 220 that the UE 115-*a* may use to receive a downlink transmission from the base station 105-*a*.

Alternatively, in some other cases, the base station 105-*a* (e.g., the network) may initiate panel selection at the UE 115-*a* such that the base station 105-*a* may transmit signaling selecting or activating one or more antenna panels 220 at the UE 115-*a*. For example, the base station 105-*a* may transmit activation signaling 215 indicating one or more antenna panels 220 that the UE 115-*a* may use for transmitting signaling to the base station 105-*a* or receiving signaling from the base station 105-*a*. In some aspects, each antenna panel 220 may be associated with a panel ID and the base station 105-*a* may transmit an indication of one or more panel IDs corresponding to the antenna panels 220 that the base station 105-*a* selects or activates at the UE 115-*a*.

In some examples, however, the UE 115-*a* may have a capability 210 that limits a quantity of antenna panel switches that the UE 115-*a*, which may be unknown to the base station 105-*a*. In other words, the UE 115-*a*, based on a capability 210 of the UE 115-*a*, may switch from one antenna panel 220 to another antenna panel 220 up to a maximum amount of times within a time period (such as within a slot). In examples in which the base station 105-*a* is unaware of the capability 210 of the UE 115-*a*, the base station 105-*a* may transmit activation signaling 215 indicating a quantity of antenna panel switches that exceeds the maximum quantity of antenna panel switches that the UE 115-*a* may perform (e.g., within the time period). As such, the UE 115-*a* may be unable to perform one or more of the antenna panel switches requested by the base station 105-*a* or may be unable to perform one or more antenna panel switches that the UE 115-*a* may have otherwise performed had the capability 210 of the UE 115-*a* not been exceeded. For example, if the base station 105-*a* configures or otherwise instructs the UE 115-*a* to perform a quantity of antenna panel switches within a slot greater than the maximum quantity of antenna panel switches that the UE 115-*a* is able to perform within a slot, the UE 115-*a* may be unable to perform one or more antenna panel switches associated with MPE mitigation or power saving procedures (as the maximum quantity of antenna panels switches that the UE 115-*a* may perform may be consumed by the activation signaling 215 from the base station 105-*a*).

In some implementations of the present disclosure, the UE 115-*a* and the base station 105-*a* may support a signaling exchange of the capability 210 of the UE 115-*a* to provide a mutual understanding of the maximum quantity of antenna panel switches that the UE 115-*a* may perform within a time period. For example, the UE 115-*a* may transmit an indication of the capability 210 to the base station 105-*a* such that the base station 105-*a* may be aware of the capability 210 of the base station 105-*a*. In some aspects, the capability 210 may define the quantity (e.g., the maximum quantity) of antenna panel switches that the UE 115-*a* is capable of performing within a slot or per slot.

In some examples, the UE 115-*a* may construct or otherwise generate the indication of the capability 210 such that the capability 210 is specific to one or more frequency ranges. For example, the UE 115-*a* may report the capability 210 specific to a band (e.g., radio frequency band), specific to a combination of bands (e.g., a set of radio frequency bands), specific to a component carrier, or specific to a set of component carriers. In other words, the capability 210 may indicate or otherwise provide a maximum quantity of antenna panel switches that the UE 115-*a* may perform (within a slot) per radio frequency band, per set of radio frequency bands, per component carrier, or per set of component carriers. Further, the UE 115-*a* may report the capability 210 specific to a subcarrier spacing (SCS) or a set of SCSs. For example, the capability 210 may indicate or otherwise provide a maximum quantity of antenna panel switches that the UE 115-*a* may perform (within a slot) for SCSs of one or both of 15 kHz and 30 kHz, a maximum quantity of antenna panel switches that the UE 115-*a* may perform (within a slot) for SCSs of one or both of 60 kHz and 120 kHz, and so on.

Additionally or alternatively, the UE 115-*a* may construct or otherwise generate the indication of the capability 210 such that the capability 210 is specific to one or more antenna panels 220 of the UE 115-*a*. For example, the capability 210 may be specific to an antenna panel 220 or specific to a set of (multiple) antenna panels 220. In other words, the capability 210 may indicate or otherwise provide a maximum quantity of antenna panel switches that the UE 115-*a* may perform (within a slot) per antenna panel 220 or per set of antenna panels 220. In such examples, the UE 115-*a* may detect or otherwise determine that switches between some first antenna panels 220 may be simpler (e.g., faster or associated with relatively lower complexity or processing costs) than switches between some second antenna panels 220 such that the UE 115-*a* may switch between the first antenna panels 220 more frequently than between the second antenna panels 220.

As such, the indication of the capability 210 may include an information element (e.g., an optional information element) that indicates a value corresponding to the maximum quantity of antenna panel switches that the UE 115-*a* is capable of performing per slot specific to a frequency band, a set of frequency bands, an SCS, a component carrier, a set of component carriers, an antenna panel 220, a set of antenna panels 220, or a combination thereof. For instance, the UE 115-*a* may convey the capability 210 based on a format illustrated by Table 1. As shown below by Table 1, the UE 115-*a* may convey the maximum quantity of antenna panel switches that the UE 115-*a* is capable of performing per slot as a function of frequency band, SCS, whether the UE 115-*a* is operating or communicating over an FR2 radio frequency, component carrier, or antenna panels 220 being operated, or a subset thereof. In some aspects, the maximum number of antenna panel switches may be specific for uplink transmissions or specific for downlink transmissions, or be for both.

TABLE 1

| Capability Format | | | | |
| --- | --- | --- | --- | --- |
| Maximum Number of Antenna Panel Switches: Defines the number of antenna panel switches UE can perform on this band within a slot. UE may report one value per each SCS supported by the UE. | Band No. | FR2 Only | Component Carrier(s) | Antenna Panel(s) |

The UE 115-*a* may transmit the capability 210 to the base station 105-*a* based on generating the indication of the capability 210 and the base station 105-*a* likewise may receive and identify the capability 210 of the UE 115-*a*. The UE 115-*a* may transmit the capability 210 via RRC signaling, a MAC control element (MAC-CE), or uplink control information (UCI). Based on receiving the capability 210, and in examples in which the base station 105-*a* configures or otherwise instructs the UE 115-*a* of one or more antenna panels 220 to operate for communication with the base station 105-*a*, the base station 105-*a* may provide such a configuration or instruction to the UE 115-*a* while accounting for and satisfying the capability 210 of the UE 115-*a*. For example, the base station 105-*a* may transmit activation signaling 215 indicating one or more antenna panel switches at the UE 115-*a* based on the maximum quantity of antenna panel switches per slot indicated by the capability 210. To satisfy the capability 210, the one or more antenna panel switches indicated by the base station 105-*a* via the activation signaling 215 may be less than or equal to the maximum quantity of antenna panel switches conveyed by the capability 210.

In some aspects, the base station 105-*a* may indicate the one or more antenna panel switches via the activation signaling 215 based on including, within the activation signaling 215, one or more panel ID changes across time periods, such as symbols. For example, the activation signaling 215 may indicate one or more panel IDs for each (if not all) symbol of a slot such that the UE 115-*a* may operate the antenna panels 220 corresponding to the indicated one or more panel IDs for transmitting or receiving during that symbol. Accordingly, antenna panel switches may refer to instances in which the activation signaling 215 indicates one or more first panel IDs for a first symbol of the slot and one or more second panel IDs different from the one or more first panel IDs for a second and subsequent (e.g., immediately subsequent) symbol of the slot. As such, panel ID changes across symbol periods within the activation signaling 215 may indicate antenna panel switches at the UE 115-*a* as the UE 115-*a* may switch from operating one or more first antenna panels 220 to operating one or more second antenna panels 220 in two consecutive symbols (however, an antenna panel switch may refer to switching between antenna panels 220 over any duration, which may include durations longer than a symbol period).

Accordingly, the UE 115-*a* and the base station 105-*a* may achieve a mutual understanding of the maximum quantity of antenna panel switches that the UE 115-*a* is capable of performing within a time period, such as a slot, and support communication between the UE 115-*a* and the base station 105-*a* that satisfies or otherwise accounts for the maximum quantity of antenna panel switches that the UE 115-*a* is capable of performing. As such, the UE 115-*a* may experience more efficient panel selection for uplink or downlink transmissions (e.g., including relatively lower overhead uplink transmissions) while also satisfying one or more conditions or constraints at the UE 115-*a*, such as MPE mitigation, power saving, or uplink or downlink interference management, or a combination thereof. Further, the UE 115-*a* may experience more efficient panel selection in deployments involving multi-panel configurations, such as multi-TRP deployments in which the UE 115-*a* may transmit or receive with multiple TRPs simultaneously via different antenna panels 220 of the UE 115-*a*. For example, although the UE 115-*a* is shown as communicating with the base station 105-*a*, the UE 115-*a* may communicate with any number of base stations 105 or TRPs without exceeding the scope of the present disclosure.

Figure 3:
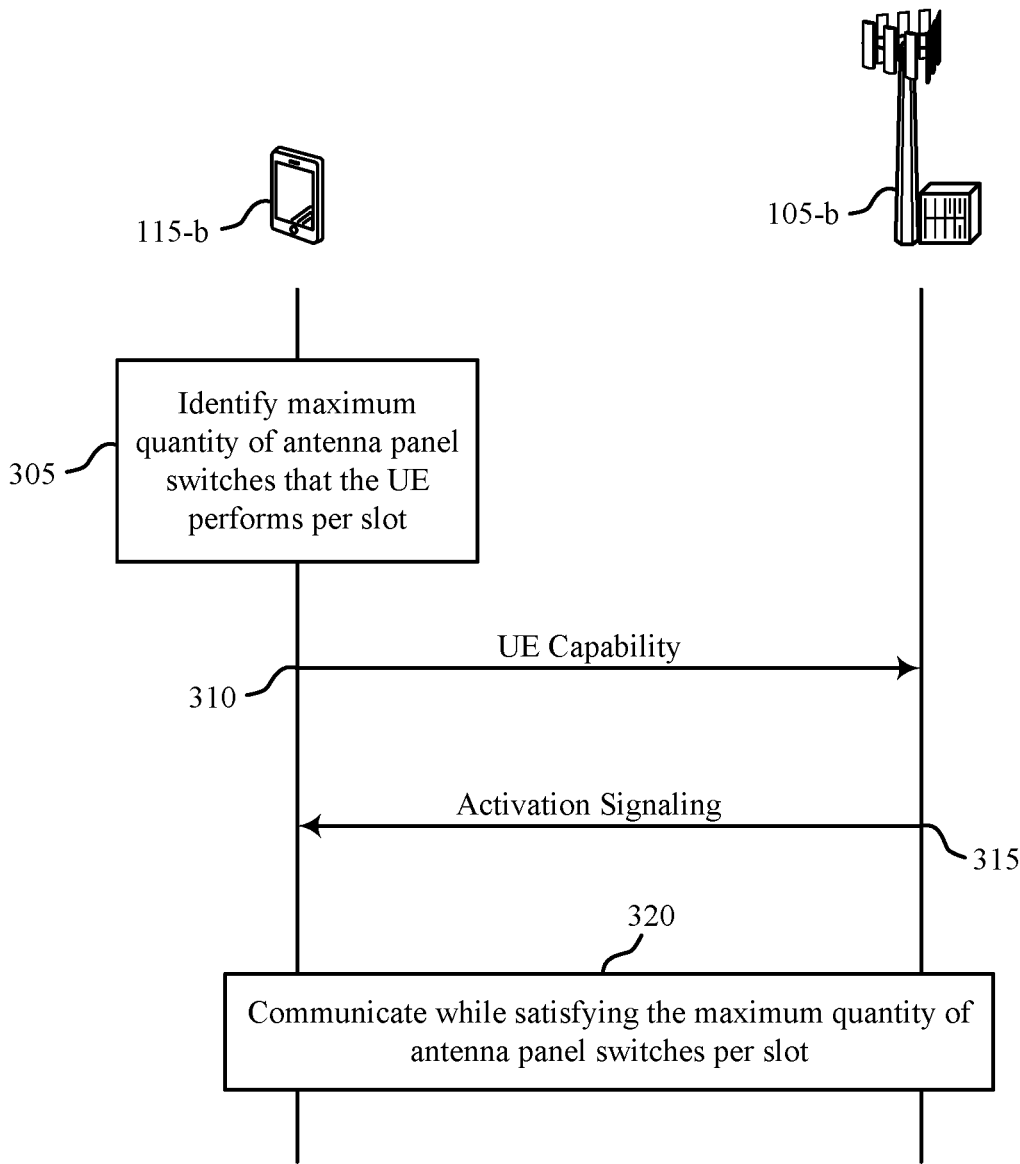
FIG. 3 illustrates an example of a process flow that supports techniques for signaling a panel switching capability of a UE in accordance with aspects of the present disclosure.

FIG. 3 illustrates an example of a process flow 300 that supports techniques for signaling a panel switching capability of a UE in accordance with aspects of the present disclosure. The process flow 300 may implement or be implemented to realize aspects of the wireless communications system 100 or the wireless communications system 200. For example, the process flow 300 may illustrate communication between a UE 115-*b* and a base station 105-*b*, which may be examples of corresponding devices described herein, including with reference to FIGS. 1 and 2. In some examples, the UE 115-*b* may transmit, to the base station 105-*b*, a UE capability associated with a maximum quantity of antenna panel switches that the UE 115-*b* is capable of performing per time period, such as per slot.

In the following description of the process flow 300, the operations may be performed (e.g., reported or provided) in a different order than the order shown, or the operations performed by the UE 115-*b* and the base station 105-*b* may be performed in different orders or at different times. For example, specific operations may also be left out of the process flow 300, or other operations may be added to the process flow 300. Further, although some operations or signaling may be shown to occur at different times for discussion purposes, these operations may actually occur at the same time.

At 305, the UE 115-*b* may identify, as a UE capability, a maximum quantity of antenna panel switches that the UE 115-*b* performs (e.g., is capable of performing) per slot. In some aspects, the UE 115-*b* may also identify the maximum quantity of antenna panel switches that the UE 115-*b* is capable of performing based on or as a function of a radio frequency band, a set of radio frequency bands, a component carrier, a set of component carriers, an SCS, or which antenna panels of the UE 115-*b* are being operated.

At 310, the UE 115-*b* may transmit, to the base station 105-*b*, an indication of the UE capability. In some examples, the UE 115-*b* may additionally transmit an indication of a frequency range (e.g., a radio frequency band, a set of radio frequency bands, a component carrier, or a set of component carriers) over which the maximum quantity of antenna panel switches per slot applies. Additionally or alternatively, the UE 115-*b* may transmit an indication of a set of antenna panels for which the maximum quantity of antenna panel switches per slot applies. In some aspects, the UE 115-*b* may transmit the indication of the UE capability via RRC signaling, a MAC-CE, or UCI.

At 315, the UE 115-*b* may receive, from the base station 105-*b*, activation signaling indicating one or more antenna panel switches at the UE 115-*b* based on the maximum quantity of antenna panel switches per slot indicated by the UE capability. In some examples, the base station 105-*b* may convey the one or more antenna panel switches at the UE 115-*b* via the activation signaling based on indicating one or more panel ID changes across one or more symbol periods within a slot (such that a change in panel ID across two symbol periods may refer or correspond to an antenna panel switch at the UE 115-*b* across the two symbol periods).

At 320, the UE 115-*b* may communicate with the base station 105-*b* via one or more antenna panels of the UE 115-*b* while satisfying the maximum quantity of antenna panel switches per slot indicated by the UE capability. In some examples, to satisfy the maximum quantity of antenna panel switches per slot indicated by the UE capability, the UE 115-*b* may perform a first quantity of antenna panel switches with a slot such that the first quantity of antenna panel switches is less than or equal to the maximum quantity of antenna panel switches per slot indicated by the UE capability.

Figure 4:
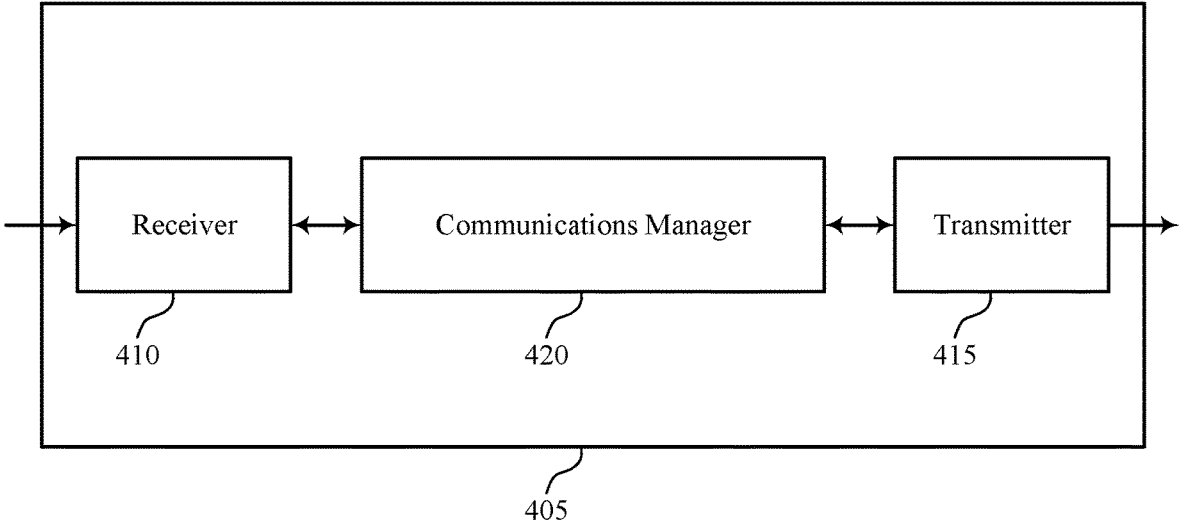
FIGS. 4 and 5 show block diagrams of devices that support techniques for signaling a panel switching capability of a UE in accordance with aspects of the present disclosure.

FIG. 4 shows a block diagram 400 of a device 405 that supports techniques for signaling a panel switching capability of a UE in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for signaling a panel switching capability of a UE). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for signaling a panel switching capability of a UE). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for signaling a panel switching capability of a UE as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for identifying, as a UE capability, a maximum quantity of antenna panel switches that the UE performs per slot. The communications manager 420 may be configured as or otherwise support a means for transmitting, to a base station, an indication of the UE capability. The communications manager 420 may be configured as or otherwise support a means for communicating with the base station via one or more antenna panels of the UE while satisfying the maximum quantity of antenna panel switches per slot indicated by the UE capability.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced power consumption, greater MPE mitigation, uplink interference management, and a greater likelihood for successful communication in some deployments, such as multi-TRP deployments.

Figure 5:
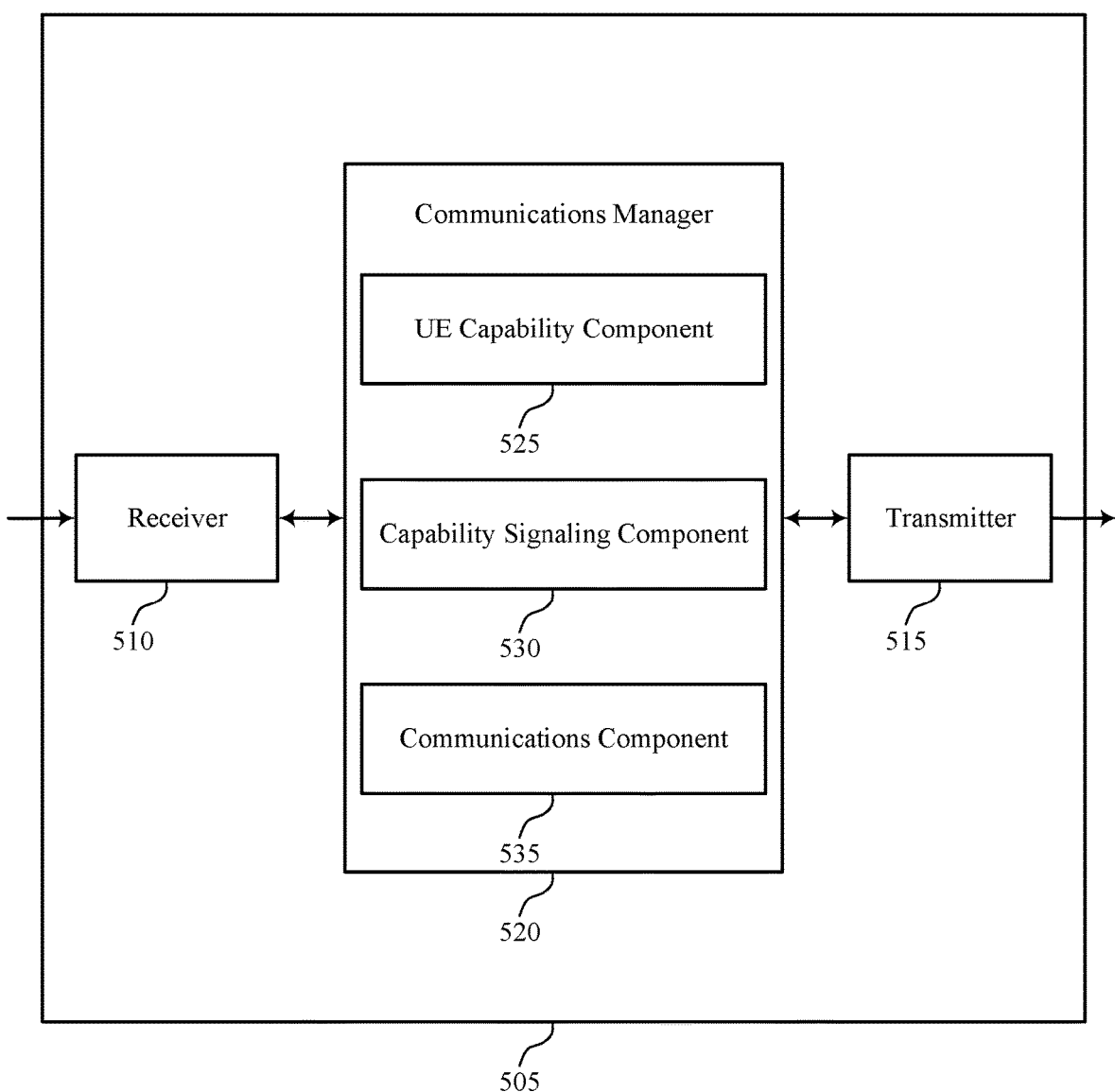

FIG. 5 shows a block diagram 500 of a device 505 that supports techniques for signaling a panel switching capability of a UE in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for signaling a panel switching capability of a UE). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for signaling a panel switching capability of a UE). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for signaling a panel switching capability of a UE as described herein. For example, the communications manager 520 may include a UE capability component 525, a capability signaling component 530, a communications component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The UE capability component 525 may be configured as or otherwise support a means for identifying, as a UE capability, a maximum quantity of antenna panel switches that the UE performs per slot. The capability signaling component 530 may be configured as or otherwise support a means for transmitting, to a base station, an indication of the UE capability. The communications component 535 may be configured as or otherwise support a means for communicating with the base station via one or more antenna panels of the UE while satisfying the maximum quantity of antenna panel switches per slot indicated by the UE capability.

Figure 6:
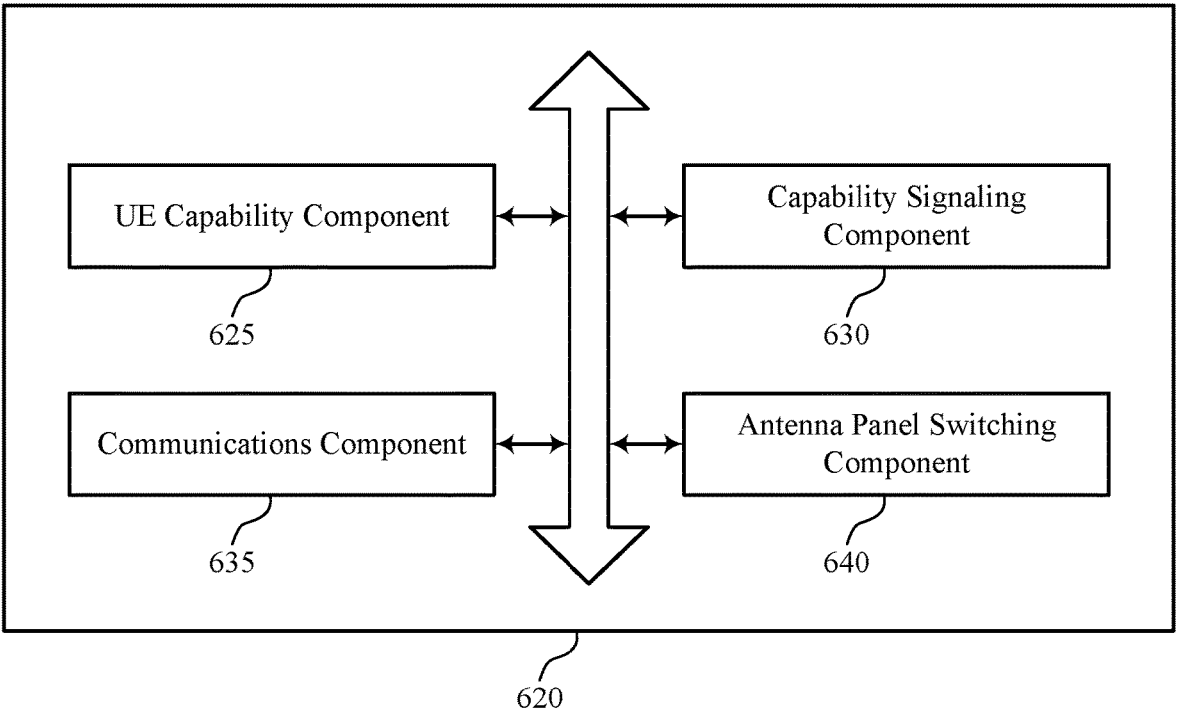
FIG. 6 shows a block diagram of a communications manager that supports techniques for signaling a panel switching capability of a UE in accordance with aspects of the present disclosure.

FIG. 6 shows a block diagram 600 of a communications manager 620 that supports techniques for signaling a panel switching capability of a UE in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for signaling a panel switching capability of a UE as described herein. For example, the communications manager 620 may include a UE capability component 625, a capability signaling component 630, a communications component 635, an antenna panel switching component 640, or any combination thereof. Each of these components may communicate, directly or indirectly, with one another (e.g., via one or more buses).

The communications manager 620 may support wireless communication at a UE in accordance with examples as disclosed herein. The UE capability component 625 may be configured as or otherwise support a means for identifying, as a UE capability, a maximum quantity of antenna panel switches that the UE performs per slot. The capability signaling component 630 may be configured as or otherwise support a means for transmitting, to a base station, an indication of the UE capability. The communications component 635 may be configured as or otherwise support a means for communicating with the base station via one or more antenna panels of the UE while satisfying the maximum quantity of antenna panel switches per slot indicated by the UE capability.

In some examples, to support transmitting the indication of the UE capability, the capability signaling component 630 may be configured as or otherwise support a means for transmitting an indication of a frequency range over which the maximum quantity of antenna panel switches per slot applies. In some examples, the frequency range includes a radio frequency band, a set of radio frequency bands, or a component carrier. In some examples, to support transmitting the indication of the UE capability, the capability signaling component 630 may be configured as or otherwise support a means for transmitting an indication of a set of antenna panels for which the maximum quantity of antenna panel switches per slot applies.

In some examples, the antenna panel switching component 640 may be configured as or otherwise support a means for receiving, from the base station, activation signaling indicating one or more antenna panel switches at the UE based on the maximum quantity of antenna panel switches per slot indicated by the UE capability, where communicating with the base station via the one or more antenna panels of the UE is based on receiving the activation signaling.

In some examples, to support receiving the activation signaling indicating the one or more antenna panel switches at the UE, the antenna panel switching component 640 may be configured as or otherwise support a means for receiving an indication of one or more panel ID changes across one or more symbol periods within a slot, where communicating with the base station via the one or more antenna panels of the UE is based on the one or more panel ID changes across the one or more symbol periods within the slot.

In some examples, to support satisfying the maximum quantity of antenna panel switches per slot indicated by the UE capability, the antenna panel switching component 640 may be configured as or otherwise support a means for performing a first quantity of antenna panel switches within a slot, where the first quantity of antenna panel switches is less than or equal to the maximum quantity of antenna panel switches per slot indicated by the UE capability. In some examples, the indication of the UE capability is transmitted via RRC signaling, a MAC-CE, or UCI.

Figure 7:
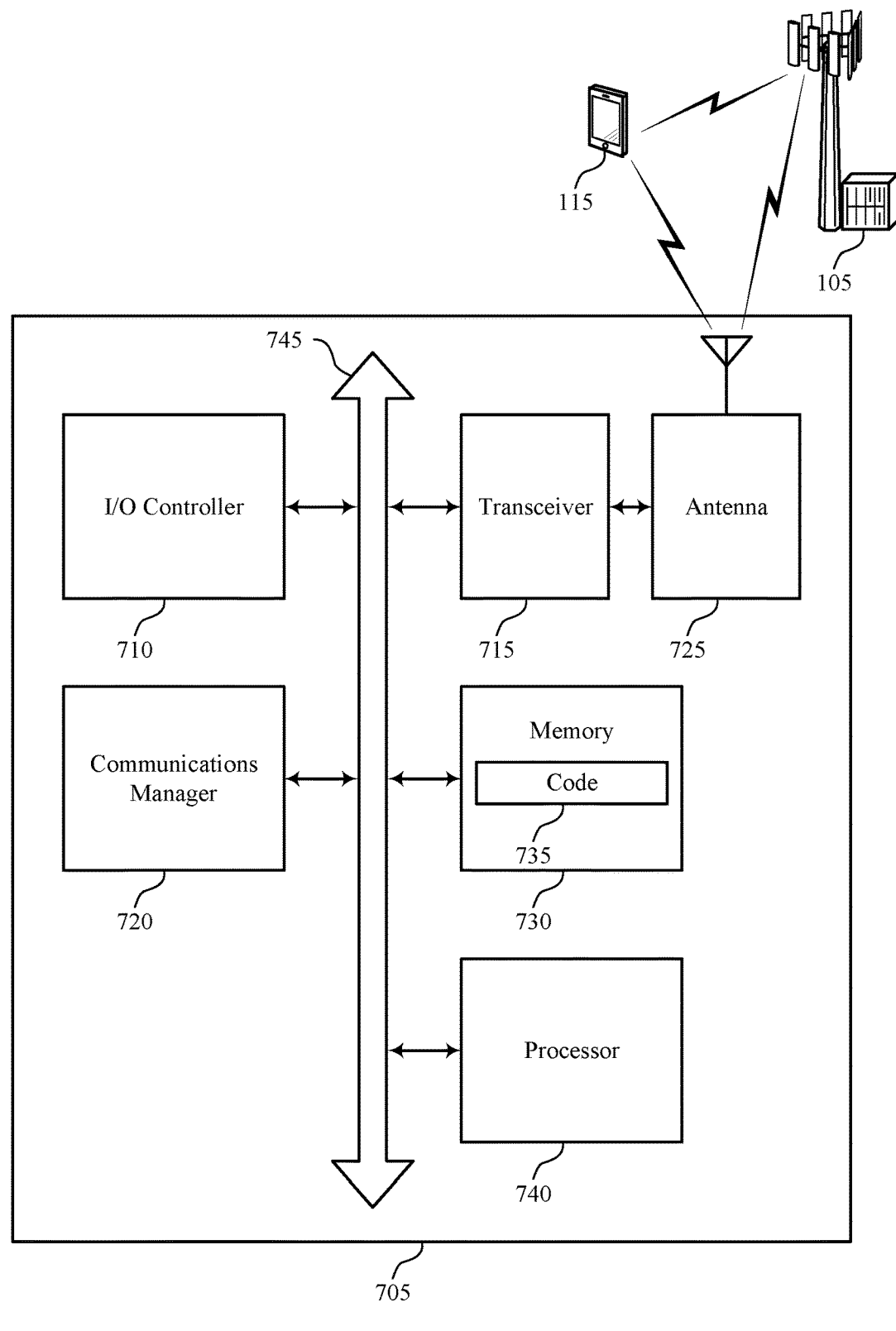
FIG. 7 shows a diagram of a system including a device that supports techniques for signaling a panel switching capability of a UE in accordance with aspects of the present disclosure.

FIG. 7 shows a diagram of a system 700 including a device 705 that supports techniques for signaling a panel switching capability of a UE in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for signaling a panel switching capability of a UE). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for identifying, as a UE capability, a maximum quantity of antenna panel switches that the UE performs per slot. The communications manager 720 may be configured as or otherwise support a means for transmitting, to a base station, an indication of the UE capability. The communications manager 720 may be configured as or otherwise support a means for communicating with the base station via one or more antenna panels of the UE while satisfying the maximum quantity of antenna panel switches per slot indicated by the UE capability.

By including or configuring the communications manager 720 in accordance with examples as described herein, the device 705 may support techniques for improved communication reliability, reduced power consumption, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for signaling a panel switching capability of a UE as described herein, or the processor 740 and the memory 730 may be otherwise configured to perform or support such operations.

FIG. 8 shows a block diagram 800 of a device 805 that supports techniques for signaling a panel switching capability of a UE in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for signaling a panel switching capability of a UE). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for signaling a panel switching capability of a UE). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for signaling a panel switching capability of a UE as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, from a UE, an indication of a UE capability associated with a maximum quantity of antenna panel switches that the UE performs per slot. The communications manager 820 may be configured as or otherwise support a means for communicating with the UE via one or more antenna panels of the UE while satisfying the maximum quantity of antenna panel switches per slot indicated by the UE capability.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption, greater MPE mitigation, uplink interference management, and a greater likelihood for successful communication in some deployments, such as in multi-TRP deployments.

Figure 9:
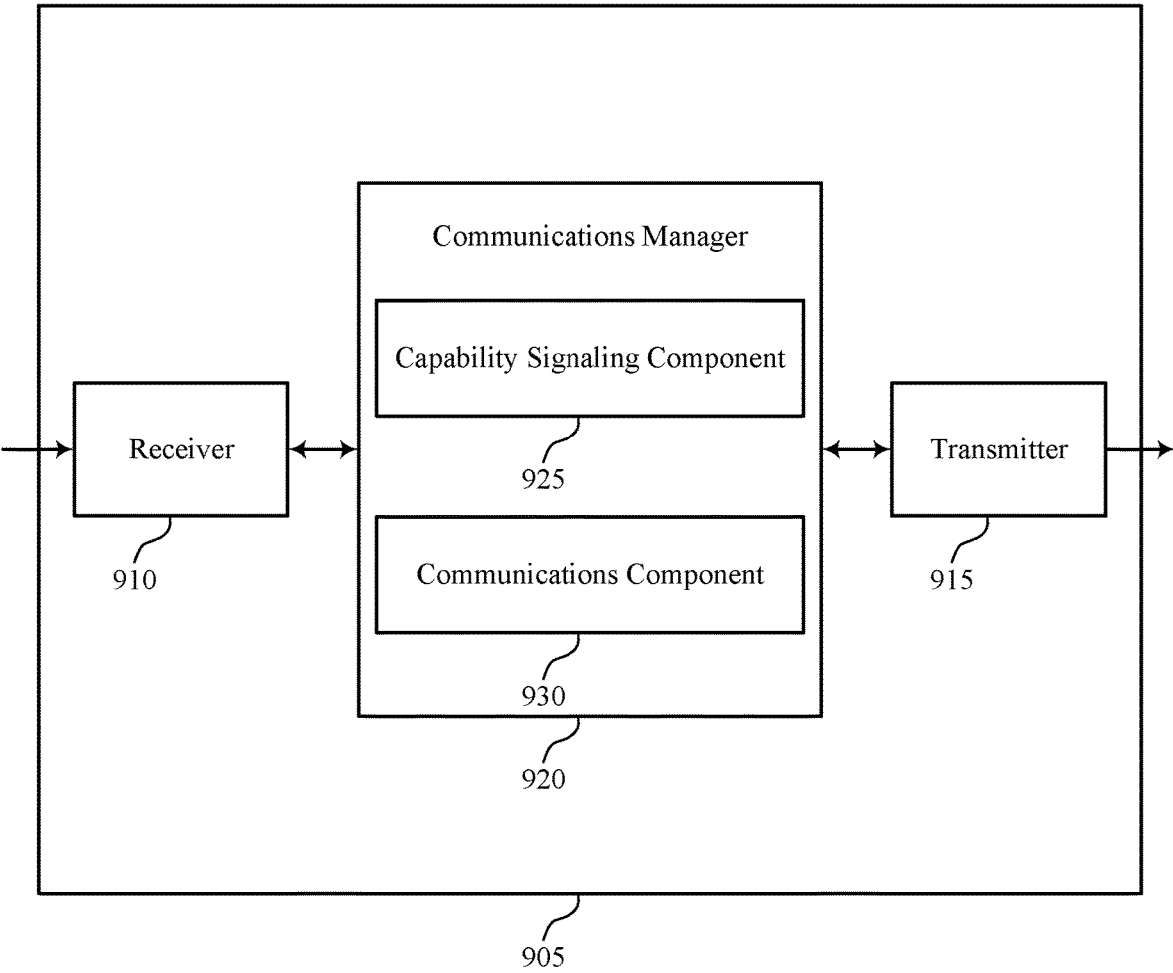

FIG. 9 shows a block diagram 900 of a device 905 that supports techniques for signaling a panel switching capability of a UE in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for signaling a panel switching capability of a UE). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for signaling a panel switching capability of a UE). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for signaling a panel switching capability of a UE as described herein. For example, the communications manager 920 may include a capability signaling component 925 a communications component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The capability signaling component 925 may be configured as or otherwise support a means for receiving, from a UE, an indication of a UE capability associated with a maximum quantity of antenna panel switches that the UE performs per slot. The communications component 930 may be configured as or otherwise support a means for communicating with the UE via one or more antenna panels of the UE while satisfying the maximum quantity of antenna panel switches per slot indicated by the UE capability.

Figure 10:
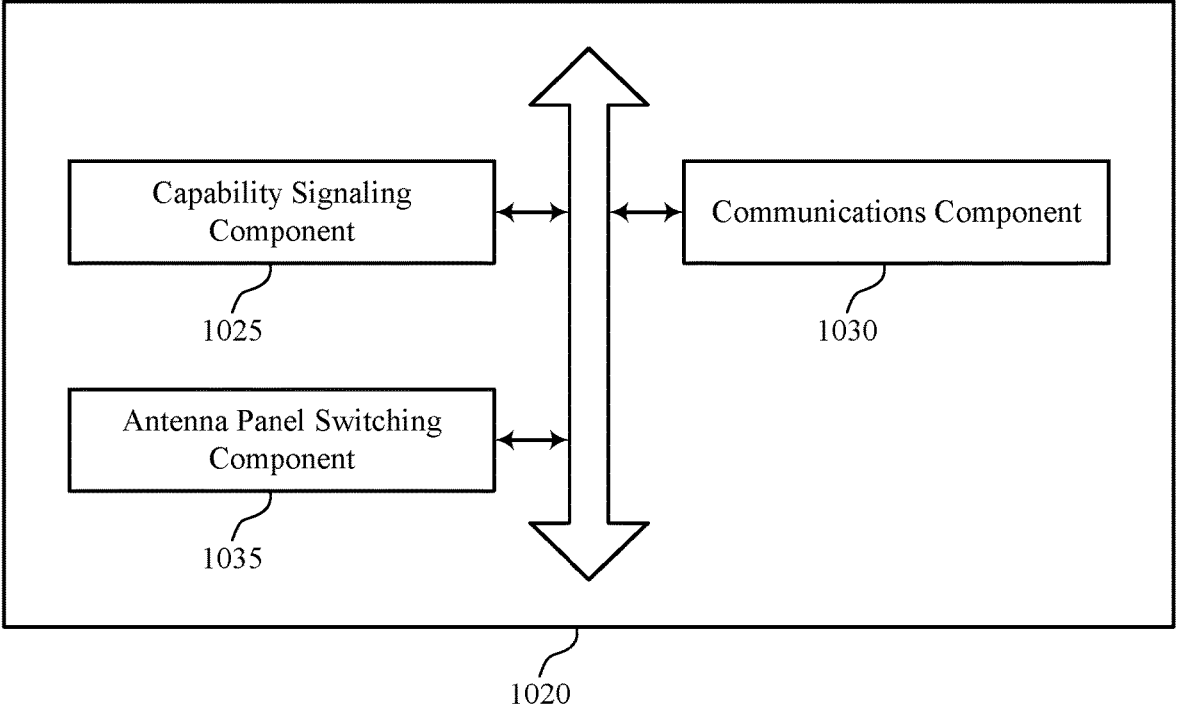
FIG. 10 shows a block diagram of a communications manager that supports techniques for signaling a panel switching capability of a UE in accordance with aspects of the present disclosure.

FIG. 10 shows a block diagram 1000 of a communications manager 1020 that supports techniques for signaling a panel switching capability of a UE in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for signaling a panel switching capability of a UE as described herein. For example, the communications manager 1020 may include a capability signaling component 1025, a communications component 1030, an antenna panel switching component 1035, or any combination thereof. Each of these components may communicate, directly or indirectly, with one another (e.g., via one or more buses).

The communications manager 1020 may support wireless communication at a base station in accordance with examples as disclosed herein. The capability signaling component 1025 may be configured as or otherwise support a means for receiving, from a UE, an indication of a UE capability associated with a maximum quantity of antenna panel switches that the UE performs per slot. The communications component 1030 may be configured as or otherwise support a means for communicating with the UE via one or more antenna panels of the UE while satisfying the maximum quantity of antenna panel switches per slot indicated by the UE capability.

In some examples, to support receiving the indication of the UE capability, the capability signaling component 1025 may be configured as or otherwise support a means for receiving an indication of a frequency range over which the maximum quantity of antenna panel switches per slot applies. In some examples, the frequency range includes a radio frequency band, a set of radio frequency bands, or a component carrier. In some examples, to support receiving the indication of the UE capability, the capability signaling component 1025 may be configured as or otherwise support a means for receiving an indication of a set of antenna panels for which the maximum quantity of antenna panel switches per slot applies.

In some examples, the antenna panel switching component 1035 may be configured as or otherwise support a means for transmitting, to the UE, activation signaling indicating one or more antenna panel switches at the UE based on the maximum quantity of antenna panel switches per slot indicated by the UE capability, where communicating with the UE via the one or more antenna panels of the UE is based on transmitting the activation signaling.

In some examples, to support transmitting the activation signaling indicating the one or more antenna panel switches at the UE, the antenna panel switching component 1035 may be configured as or otherwise support a means for transmitting an indication of one or more panel ID changes across one or more symbol periods within a slot, where communicating with the UE via the one or more antenna panels of the UE is based on the one or more panel ID changes across the one or more symbol periods within the slot. In some examples, the indication of the UE capability is received via RRC signaling, a MAC-CE, or UCI.

Figure 11:
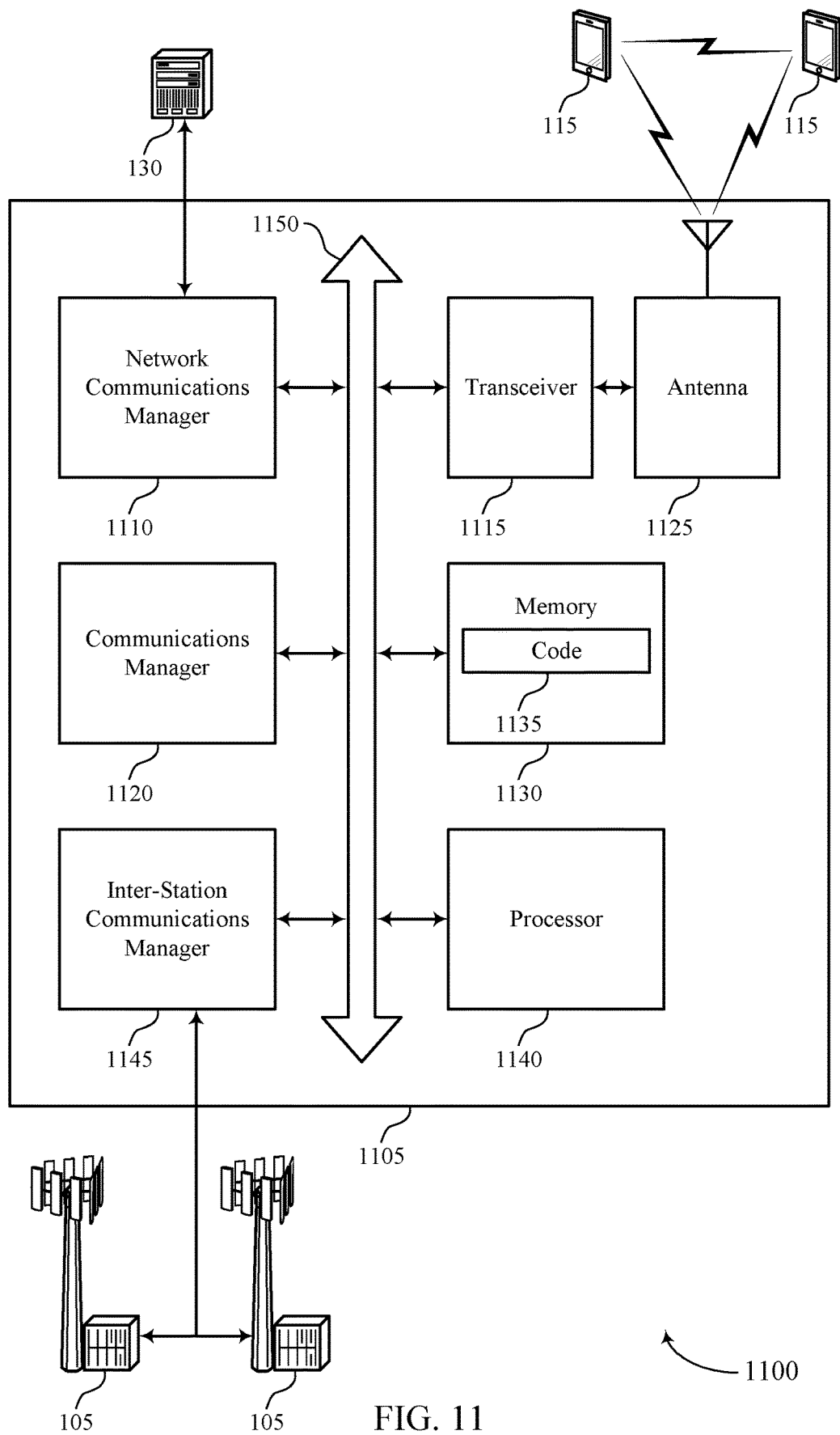
FIG. 11 shows a diagram of a system including a device that supports techniques for signaling a panel switching capability of a UE in accordance with aspects of the present disclosure.

FIG. 11 shows a diagram of a system 1100 including a device 1105 that supports techniques for signaling a panel switching capability of a UE in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for signaling a panel switching capability of a UE). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, from a UE, an indication of a UE capability associated with a maximum quantity of antenna panel switches that the UE performs per slot. The communications manager 1120 may be configured as or otherwise support a means for communicating with the UE via one or more antenna panels of the UE while satisfying the maximum quantity of antenna panel switches per slot indicated by the UE capability.

By including or configuring the communications manager 1120 in accordance with examples as described herein, the device 1105 may support techniques for improved communication reliability, reduced power consumption, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for signaling a panel switching capability of a UE as described herein, or the processor 1140 and the memory 1130 may be otherwise configured to perform or support such operations.

Figure 12:
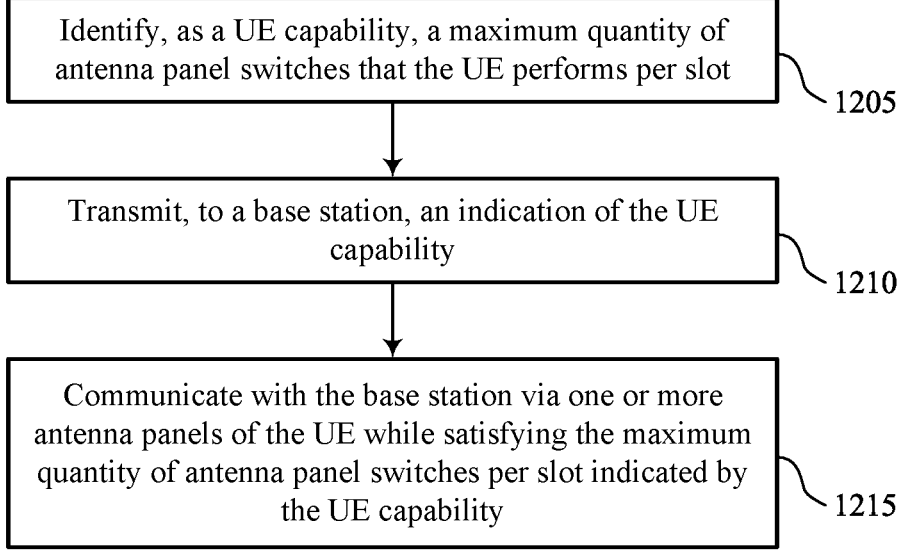

FIG. 12 shows a flowchart illustrating a method 1200 that supports techniques for signaling a panel switching capability of a UE in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include identifying, as a UE capability, a maximum quantity of antenna panel switches that the UE performs per slot. The operations of 1205 may be performed in accordance with examples as disclosed herein. In some examples, aspects of the operations of 1205 may be performed by a UE capability component 625 as described with reference to FIG. 6.

At 1210, the method may include transmitting, to a base station, an indication of the UE capability. The operations of 1210 may be performed in accordance with examples as disclosed herein. In some examples, aspects of the operations of 1210 may be performed by a capability signaling component 630 as described with reference to FIG. 6.

At 1215, the method may include communicating with the base station via one or more antenna panels of the UE while satisfying the maximum quantity of antenna panel switches per slot indicated by the UE capability. The operations of 1215 may be performed in accordance with examples as disclosed herein. In some examples, aspects of the operations of 1215 may be performed by a communications component 635 as described with reference to FIG. 6.

FIG. 13 shows a flowchart illustrating a method 1300 that supports techniques for signaling a panel switching capability of a UE in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include identifying, as a UE capability, a maximum quantity of antenna panel switches that the UE performs per slot. The operations of 1305 may be performed in accordance with examples as disclosed herein. In some examples, aspects of the operations of 1305 may be performed by a UE capability component 625 as described with reference to FIG. 6.

At 1310, the method may include transmitting, to a base station, an indication of the UE capability. The operations of 1310 may be performed in accordance with examples as disclosed herein. In some examples, aspects of the operations of 1310 may be performed by a capability signaling component 630 as described with reference to FIG. 6.

At 1315, the method may include receiving, from the base station, activation signaling indicating one or more antenna panel switches at the UE based on the maximum quantity of antenna panel switches per slot indicated by the UE capability. The operations of 1315 may be performed in accordance with examples as disclosed herein. In some examples, aspects of the operations of 1315 may be performed by an antenna panel switching component 640 as described with reference to FIG. 6.

At 1320, the method may include communicating with the base station via one or more antenna panels of the UE while satisfying the maximum quantity of antenna panel switches per slot indicated by the UE capability. The operations of 1320 may be performed in accordance with examples as disclosed herein. In some examples, aspects of the operations of 1320 may be performed by a communications component 635 as described with reference to FIG. 6.

Figure 14:
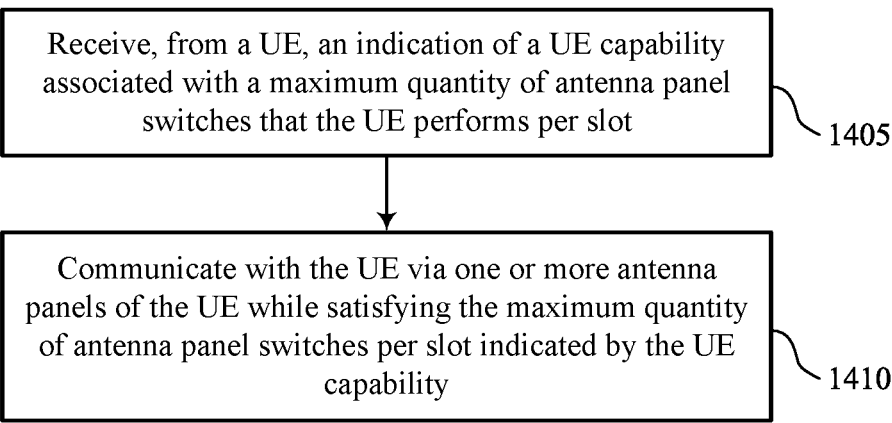

FIG. 14 shows a flowchart illustrating a method 1400 that supports techniques for signaling a panel switching capability of a UE in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving, from a UE, an indication of a UE capability associated with a maximum quantity of antenna panel switches that the UE performs per slot. The operations of 1405 may be performed in accordance with examples as disclosed herein. In some examples, aspects of the operations of 1405 may be performed by a capability signaling component 1025 as described with reference to FIG. 10.

At 1410, the method may include communicating with the UE via one or more antenna panels of the UE while satisfying the maximum quantity of antenna panel switches per slot indicated by the UE capability. The operations of 1410 may be performed in accordance with examples as disclosed herein. In some examples, aspects of the operations of 1410 may be performed by a communications component 1030 as described with reference to FIG. 10.

FIG. 15 shows a flowchart illustrating a method 1500 that supports techniques for signaling a panel switching capability of a UE in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, an indication of a UE capability associated with a maximum quantity of antenna panel switches that the UE performs per slot. The operations of 1505 may be performed in accordance with examples as disclosed herein. In some examples, aspects of the operations of 1505 may be performed by a capability signaling component 1025 as described with reference to FIG. 10.

At 1510, the method may include transmitting, to the UE, activation signaling indicating one or more antenna panel switches at the UE based on the maximum quantity of antenna panel switches per slot indicated by the UE capability. The operations of 1510 may be performed in accordance with examples as disclosed herein. In some examples, aspects of the operations of 1510 may be performed by an antenna panel switching component 1035 as described with reference to FIG. 10.

At 1515, the method may include communicating with the UE via one or more antenna panels of the UE while satisfying the maximum quantity of antenna panel switches per slot indicated by the UE capability. The operations of 1515 may be performed in accordance with examples as disclosed herein. In some examples, aspects of the operations of 1515 may be performed by a communications component 1030 as described with reference to FIG. 10.

The following provides an overview of aspects of the present disclosure:

Aspect 1: A method for wireless communication at a UE, comprising: identifying, as a UE capability, a maximum quantity of antenna panel switches that the UE performs per slot; transmitting, to a base station, an indication of the UE capability; and communicating with the base station via one or more antenna panels of the UE while satisfying the maximum quantity of antenna panel switches per slot indicated by the UE capability.

Aspect 2: The method of aspect 1, wherein transmitting the indication of the UE capability comprises: transmitting an indication of a frequency range over which the maximum quantity of antenna panel switches per slot applies.

Aspect 3: The method of aspect 2, wherein the frequency range comprises a radio frequency band, a set of radio frequency bands, or a component carrier.

Aspect 4: The method of any of aspects 1 through 3, wherein transmitting the indication of the UE capability comprises: transmitting an indication of a set of antenna panels for which the maximum quantity of antenna panel switches per slot applies.

Aspect 5: The method of any of aspects 1 through 4, further comprising: receiving, from the base station, activation signaling indicating one or more antenna panel switches at the UE based at least in part on the maximum quantity of antenna panel switches per slot indicated by the UE capability, wherein communicating with the base station via the one or more antenna panels of the UE is based at least in part on receiving the activation signaling.

Aspect 6: The method of aspect 5, wherein receiving the activation signaling indicating the one or more antenna panel switches at the UE comprises: receiving an indication of one or more panel ID changes across one or more symbol periods within a slot, wherein communicating with the base station via the one or more antenna panels of the UE is based at least in part on the one or more panel ID changes across the one or more symbol periods within the slot.

Aspect 7: The method of any of aspects 1 through 6, wherein satisfying the maximum quantity of antenna panel switches per slot indicated by the UE capability comprises: performing a first quantity of antenna panel switches within a slot, wherein the first quantity of antenna panel switches is less than or equal to the maximum quantity of antenna panel switches per slot indicated by the UE capability.

Aspect 8: The method of any of aspects 1 through 7, wherein the indication of the UE capability is transmitted via RRC signaling, a MAC-CE, or UCI.

Aspect 9: A method for wireless communication at a base station, comprising: receiving, from a UE, an indication of a UE capability associated with a maximum quantity of antenna panel switches that the UE performs per slot; and communicating with the UE via one or more antenna panels of the UE while satisfying the maximum quantity of antenna panel switches per slot indicated by the UE capability.

Aspect 10: The method of aspect 9, wherein receiving the indication of the UE capability comprises: receiving an indication of a frequency range over which the maximum quantity of antenna panel switches per slot applies.

Aspect 11: The method of aspect 10, wherein the frequency range comprises a radio frequency band, a set of radio frequency bands, or a component carrier.

Aspect 12: The method of any of aspects 9 through 11, wherein receiving the indication of the UE capability comprises: receiving an indication of a set of antenna panels for which the maximum quantity of antenna panel switches per slot applies.

Aspect 13: The method of any of aspects 9 through 12, further comprising: transmitting, to the UE, activation signaling indicating one or more antenna panel switches at the UE based at least in part on the maximum quantity of antenna panel switches per slot indicated by the UE capability, wherein communicating with the UE via the one or more antenna panels of the UE is based at least in part on transmitting the activation signaling.

Aspect 14: The method of aspect 13, wherein transmitting the activation signaling indicating the one or more antenna panel switches at the UE comprises: transmitting an indication of one or more panel ID changes across one or more symbol periods within a slot, wherein communicating with the UE via the one or more antenna panels of the UE is based at least in part on the one or more panel ID changes across the one or more symbol periods within the slot.

Aspect 15: The method of any of aspects 9 through 14, wherein the indication of the UE capability is received via RRC signaling, a MAC-CE, or UCI.

Aspect 16: An apparatus for wireless communication at a UE, comprising a processor; memory coupled with the processor; and instructions stored in the memory and executable by the processor to cause the apparatus to perform a method of any of aspects 1 through 8.

Aspect 17: An apparatus for wireless communication at a UE, comprising at least one means for performing a method of any of aspects 1 through 8.

Aspect 18: A non-transitory computer-readable medium storing code for wireless communication at a UE, the code comprising instructions executable by a processor to perform a method of any of aspects 1 through 8.

Aspect 19: An apparatus for wireless communication at a base station, comprising a processor; memory coupled with the processor; and instructions stored in the memory and executable by the processor to cause the apparatus to perform a method of any of aspects 9 through 15.

Aspect 20: An apparatus for wireless communication at a base station, comprising at least one means for performing a method of any of aspects 9 through 15.

Aspect 21: A non-transitory computer-readable medium storing code for wireless communication at a base station, the code comprising instructions executable by a processor to perform a method of any of aspects 9 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

identifying, as a UE capability, a maximum quantity of antenna panel switches that the UE performs per slot per frequency range for a set of multiple frequency ranges and per subcarrier spacing for a set of multiple subcarrier spacings;

transmitting, to a network device, a control message that includes an indication of the UE capability, wherein to indicate the UE capability the control message includes an information element that indicates the maximum quantity of antenna panel switches per slot per frequency range for the set of multiple frequency ranges and per subcarrier spacing for the set of multiple subcarrier spacings; and communicating within a frequency range of the set of multiple frequency ranges having a subcarrier spacing of the set of multiple subcarrier spacings with the network device via one or more antenna panels of the UE while satisfying the maximum quantity of antenna panel switches per slot for the frequency range and the subcarrier spacing indicated by the UE capability.

2. The method of claim 1, wherein the frequency range comprises a radio frequency band, a set of radio frequency bands, or a component carrier.

3. The method of claim 1, wherein transmitting the control message comprises:

transmitting an indication of a set of antenna panels for which the maximum quantity of antenna panel switches per slot applies.

4. The method of claim 1, further comprising:

receiving, from the network device, activation signaling indicating one or more antenna panel switches at the UE based at least in part on the maximum quantity of antenna panel switches per slot indicated by the UE capability, wherein communicating with the network device via the one or more antenna panels of the UE is based at least in part on receiving the activation signaling.

5. The method of claim 4, wherein receiving the activation signaling indicating the one or more antenna panel switches at the UE comprises:

receiving an indication of one or more panel identifier changes across one or more symbol periods within a slot, wherein communicating with the network device via the one or more antenna panels of the UE is based at least in part on the one or more panel identifier changes across the one or more symbol periods within the slot.

6. The method of claim 1, wherein satisfying the maximum quantity of antenna panel switches per slot indicated by the UE capability comprises:

performing a first quantity of antenna panel switches within a slot, wherein the first quantity of antenna panel switches is less than or equal to the maximum quantity of antenna panel switches per slot indicated by the UE capability.

7. The method of claim 1, wherein the control message comprises radio resource control signaling, a medium access control (MAC) control element, or uplink control information.

8. The method of claim 1, wherein the indication of the UE capability further indicates that the maximum quantity of antenna panel switches per slot applies to both uplink and downlink transmissions.

9. The method of claim 1, wherein communicating with the network device via the one or more antenna panels of the UE comprises:

communicating with multiple transmission and reception points of the network device via different antenna panels of the UE.

10. A method for wireless communication at a network device, comprising:

receiving, from a user equipment (UE), a control message that includes an indication of a UE capability associated with a maximum quantity of antenna panel switches that the UE performs per slot per frequency range for a set of multiple frequency ranges and per subcarrier spacing for a set of multiple subcarrier spacings, wherein to indicate the UE capability the control message includes an information element that indicates the maximum quantity of antenna panel switches per slot per frequency range for the set of multiple frequency ranges and per subcarrier spacing for the set of multiple subcarrier spacings; and communicating within a frequency range of the set of multiple frequency ranges having a subcarrier spacing of the set of multiple subcarrier spacings with the UE via one or more antenna panels of the UE while satisfying the maximum quantity of antenna panel switches per slot for the frequency range and the subcarrier spacing indicated by the UE capability.

11. The method of claim 10, wherein the frequency range comprises a radio frequency band, a set of radio frequency bands, or a component carrier.

12. The method of claim 10, wherein receiving the control message comprises:

receiving an indication of a set of antenna panels for which the maximum quantity of antenna panel switches per slot applies.

13. The method of claim 10, further comprising:

transmitting, to the UE, activation signaling indicating one or more antenna panel switches at the UE based at least in part on the maximum quantity of antenna panel switches per slot indicated by the UE capability, wherein communicating with the UE via the one or more antenna panels of the UE is based at least in part on transmitting the activation signaling.

14. The method of claim 13, wherein transmitting the activation signaling indicating the one or more antenna panel switches at the UE comprises:

transmitting an indication of one or more panel identifier changes across one or more symbol periods within a slot, wherein communicating with the UE via the one or more antenna panels of the UE is based at least in part on the one or more panel identifier changes across the one or more symbol periods within the slot.

15. The method of claim 10, wherein control message comprises radio resource control signaling, a medium access control (MAC) control element, or uplink control information.

16. An apparatus for wireless communication at a user equipment (UE), comprising:

one or more processors;

memory coupled with the one or more processors; and instructions stored in the memory and executable by the one or more processors to cause the apparatus to:

identify, as a UE capability, a maximum quantity of antenna panel switches that the UE performs per slot per frequency range for a set of multiple frequency ranges and per subcarrier spacing for a set of multiple subcarrier spacings;

transmit, to a network device, a control message that includes an indication of the UE capability, wherein to indicate the UE capability the control message includes an information element that indicates the maximum quantity of antenna panel switches per slot per frequency range for the set of multiple frequency ranges and per subcarrier spacing for the set of multiple subcarrier spacings; and communicate within a frequency range of the set of multiple frequency ranges having a subcarrier spacing of the set of multiple subcarrier spacings with the network device via one or more antenna panels of the UE while satisfying the maximum quantity of antenna panel switches per slot for the frequency range and the subcarrier spacing indicated by the UE capability.

17. The apparatus of claim 16, wherein the frequency range comprises a radio frequency band, a set of radio frequency bands, or a component carrier.

18. The apparatus of claim 16, wherein the instructions to transmit the control message are executable by the one or more processors to cause the apparatus to:

transmit an indication of a set of antenna panels for which the maximum quantity of antenna panel switches per slot applies.

19. The apparatus of claim 16, wherein the instructions are further executable by the one or more processors to cause the apparatus to:

receive, from the network device, activation signaling indicating one or more antenna panel switches at the UE based at least in part on the maximum quantity of antenna panel switches per slot indicated by the UE capability, wherein communicating with the network device via the one or more antenna panels of the UE is based at least in part on receiving the activation signaling.

20. The apparatus of claim 19, wherein the instructions to receive the activation signaling indicating the one or more antenna panel switches at the UE are executable by the one or more processors to cause the apparatus to:

receive an indication of one or more panel identifier changes across one or more symbol periods within a slot, wherein communicating with the network device via the one or more antenna panels of the UE is based at least in part on the one or more panel identifier changes across the one or more symbol periods within the slot.

21. The apparatus of claim 16, wherein the instructions to satisfy the maximum quantity of antenna panel switches per slot indicated by the UE capability are executable by the one or more processors to cause the apparatus to:

perform a first quantity of antenna panel switches within a slot, wherein the first quantity of antenna panel switches is less than or equal to the maximum quantity of antenna panel switches per slot indicated by the UE capability.

22. The apparatus of claim 16, wherein control message comprises radio resource control signaling, a medium access control (MAC) control element, or uplink control information.

23. An apparatus for wireless communication at a network device, comprising:

one or more processors;

memory coupled with the one or more processors; and instructions stored in the memory and executable by the one or more processors to cause the apparatus to:

receive, from a user equipment (UE), a control message that includes an indication of a UE capability associated with a maximum quantity of antenna panel switches that the UE performs per slot per frequency range for a set of multiple frequency ranges and per subcarrier spacing for a set of multiple subcarrier spacings, wherein to indicate the UE capability the control message includes an information element that indicates the maximum quantity of antenna panel switches per slot per frequency range for the set of multiple frequency ranges and per subcarrier spacing for the set of multiple subcarrier spacings; and communicate within a frequency range of the set of multiple frequency ranges having a subcarrier spacing of the set of multiple subcarrier spacings with the UE via one or more antenna panels of the UE while satisfying the maximum quantity of antenna panel switches per slot for the frequency range and the subcarrier spacing indicated by the UE capability.

24. The apparatus of claim 23, wherein the frequency range comprises a radio frequency band, a set of radio frequency bands, or a component carrier.

25. The apparatus of claim 23, wherein the instructions to receive control message are executable by the one or more processors to cause the apparatus to:

receive an indication of a set of antenna panels for which the maximum quantity of antenna panel switches per slot applies.

26. The apparatus of claim 23, wherein the instructions are further executable by the one or more processors to cause the apparatus to:

transmit, to the UE, activation signaling indicating one or more antenna panel switches at the UE based at least in part on the maximum quantity of antenna panel switches per slot indicated by the UE capability, wherein communicating with the UE via the one or more antenna panels of the UE is based at least in part on transmitting the activation signaling.

27. The apparatus of claim 26, wherein the instructions to transmit the activation signaling indicating the one or more antenna panel switches at the UE are executable by the one or more processors to cause the apparatus to:

transmit an indication of one or more panel identifier changes across one or more symbol periods within a slot, wherein communicating with the UE via the one or more antenna panels of the UE is based at least in part on the one or more panel identifier changes across the one or more symbol periods within the slot.

28. The apparatus of claim 23, wherein the control message comprises radio resource control signaling, a medium access control (MAC) control element, or uplink control information.

* * * * *